Patented Dec. 31, 1935

2,026,475

UNITED STATES PATENT OFFICE 2,026,475

METAL CEMENT

Nelson W. Larmore, Waterford, N. Y., assignor to Clifford W. Frederick, Waterford, N. Y.

No Drawing. Application March 23, 1932, Serial No. 600,835

1 Claim. (Cl. 106—8)

This invention is directed to a metal cement involving the use of certain ingredients tending to a more effective, lasting and powerful cement for use in connection with metals.

The cement is made up of certain ingredients which may be identified as lacquer, iron filings, whiting, hydraulic cement and aluminum powder, and these ingredients are preferably, though not necessarily, used in the following proportions:—

To 1¾ pounds of lacquer is added 5 pounds of iron filings, 1½ pounds of whiting, ¾ pound of cement, and ⅛ pound of aluminum powder.

While the various materials employed undoubtedly have other meritorious and advantageous functions in the cement as a whole, it may be mentioned that as known to me as a result of tests, the lacquer serves as a binder and mixing vehicle, the iron filings serve to impart a metal finish to the cement, the whiting serves as a filler to close grain the filings, the cement is used as the hardening element, and the aluminum powder to provide a smooth finish for the cement and prevent the compound from rusting when exposed to the weather.

It is, of course, to be understood that while the cement is made up of the ingredients mentioned and in the proportions above set forth as probably producing the most serviceable product, yet a variation in these proportions in order that the cement may have different predominating characteristics in accord with the particular use for which it is designed is understood to be within the scope of the present invention within the protective limits of the following claim.

In mixing the ingredients, the preferable and suggested method is as follows:—All of the dry ingredients are put together and mixed well before the lacquer is added. The lacquer is then added and mixed thoroughly and the mixture is packed immediately in air-tight containers. All ingredients must be measured accurately and extreme care must be exercised to prevent all dry ingredients from being exposed to dampness.

I claim:—

A metal cement made up of the following materials in the proportions named:—

|  | Pounds |
|---|---|
| Lacquer | 1¾ |
| Iron filings | 5 |
| Whiting | 1½ |
| Hydraulic cement | ¾ |
| Aluminum powder | ⅛ |

NELSON W. LARMORE. [L. S.]